Nov. 9, 1937. A. W. WALKER Re. 20,550

SANDING DRUM

Original Filed Dec. 8, 1933

INVENTOR.
AVERY W. WALKER

BY R. C. Bennett

ATTORNEY.

Reissued Nov. 9, 1937

Re. 20,550

UNITED STATES PATENT OFFICE 20,550

SANDING DRUM

Avery W. Walker, Niagara Falls, N. Y., assignor, by mesne assignments, to The Carborundum Company, Niagara Falls, N. Y., a corporation of Delaware Original No. 1,992,105, dated February 19, 1935, Serial No. 701,489, December 8, 1933. Application for reissue August 25, 1936, Serial No. 97,732

14 Claims. (Cl. 51—194)

This invention relates to sanding and polishing abrasive drums of the general type in which the drums are provided with removable and replaceable abrasive bands or belts around their periphery, and relates particularly to drums having a new and improved mechanism for maintaining a predetermined tension on the bands while in use.

The object of the invention is to provide a new and improved drum of the character described.

It is necessary in using this type of drum to keep the band tight. Elongation of the band is the result of two forces, namely that of centrifugal force upon the mass of the belt itself, which is of considerable magnitude at the high speeds at which this type of drum is used, and that of an elongation stress caused by resistance of the work itself. These combined stresses cause an elongation sufficient to produce a loop-like locus ahead of the point of contact of the drum with the work. This constant flexing of the band tends to crack it and loosen the abrasive material, shortening the effective life of the band. Furthermore, such a loop is detrimental to the character of the polished surface. The loop changes in shape and resiliency as it approaches the slot through which the ends of the band are threaded, causing uneven pressure on the work and resulting in ridges on the surface being polished.

Devices have been developed for adjusting the tension from time to time during the grinding or polishing operation. The operation of these devices necessitated stopping the drum and making a manual adjustment. This method only partially accomplishes the desired result and is objectionable due to the loss of time involved.

Means for automatically maintaining a desired tension on the band during operation have been somewhat unsatisfactorily accomplished by others in the past. The necessity for maintaining perfect balance of the drum at all times precludes those devices in which the center of gravity shifts during progressive absorption of band elongation, and previous attempts to secure this balance have led to the use of relatively wide slots in the drums in order to accommodate various mechanisms.

In known devices of this sort the degree of tension is fixed by the installation of springs of known elasticity and can only be varied by disassembling the drum, changing the springs, lengthening or shortening the springs, or by an internal adjustment of the spring supporting members.

To obtain good results in the use of drums of this type it is necessary to have substantially perfect balance and a relatively narrow facial interruption at the slot. A very slight out of balance condition, no matter how rigid the machine and work, causes high and low spots in the finish of the work and excessive vibration with consequent wear on the bearings which in turn allows increased vibration creating a vicious cycle of constantly increasing detrimental effect. A relatively wide facial interruption due to a wide slot causes marks on the work due to periodic interruptions of contact and to a bouncing effect caused by the impact of the leading edge of the slot. It is clearly seen, then, that the narrower the slot or facial gap, the more constant is the contact, reducing the bouncing effect and reducing the non-operative interruption to a minimum.

This invention successfully overcomes these difficulties by making possible a drum of constant balance having a relatively narrow facial interruption, an improved gripping mechanism and a simplified design enabling a quick change of belts.

Figure 1:
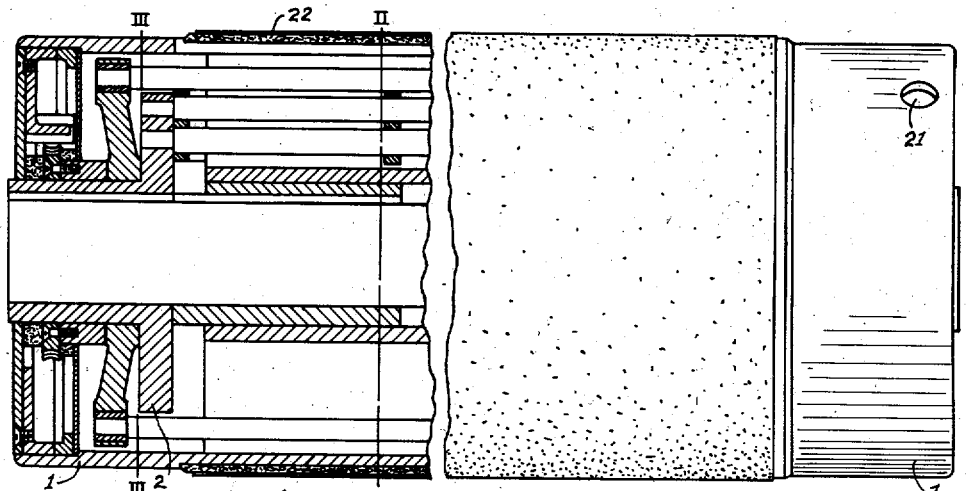
Figure 1 is a side elevation, partly in section, of an assembled drum.
Figure 2:
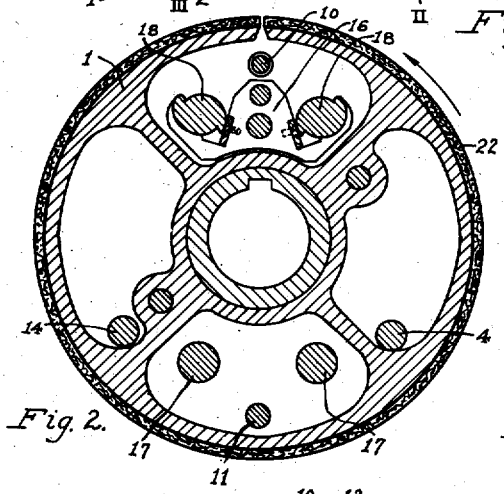
Figure 2 is a sectional view through II—II.
Figure 3:
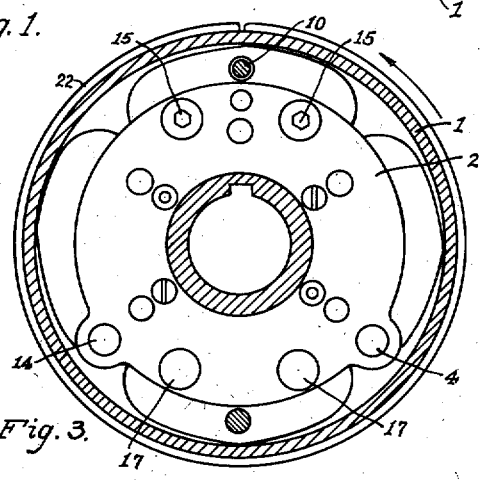
Figure 3 is a sectional view through III—III showing in elevation one of the inner members 2 upon which are mounted parts of the clamping and tensioning mechanism.

Referring to the drawing in which like numbers refer to the same parts in all views, the body 1 is a specially shaped cylindrical body adapted to be mounted on a shaft in any preferred manner, and to be rotated therewith or thereon at any desired speed. This body is provided with spokes extending longitudinally, preferably, beyond that part which is to be surfaced by the coated abrasive. This construction eliminates any bulging or expanding of the central portion of the drum which would cause uneven surfacing of wide material. The fillets at the junction of the spokes with the outer rim have a curvature of substantially parabolic shape. This construction is specifically intended to keep the drum surface truly cylindrical at all speeds so as to eliminate the bumping effect often noticed in wheels of this type which is due to a surface distortion from centrifugal force. This design is the strongest for its weight and has been found entirely free from this defect. The cylinder is provided with a longitudinal slot for applying the coated abrasive as shown. Opposite the slot sufficient material is removed to provide for balancing.

Balanced end cover plates are provided at both ends of the drum, their chief function being merely to protect the inner mechanism from mechanical injury and from collection of foreign matter during the operation of the drum. These covers are provided with holes of suitable size so disposed as to permit the operator to insert a socket wrench to tighten the clamping cams when installing a new band.

Figure 4:
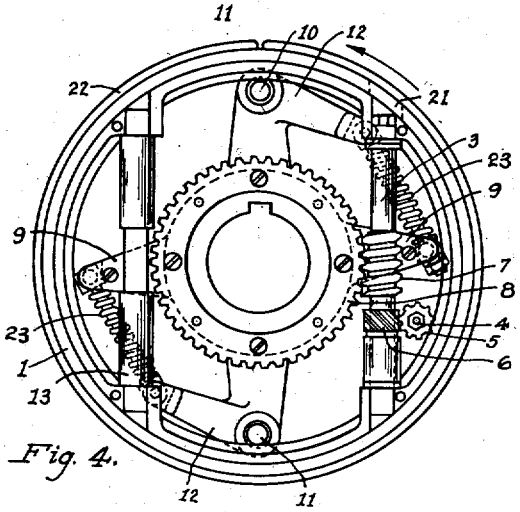
Figure 4 is an end view of an assembled drum with the cover plate removed showing the assembled tensioning mechanism.

Figure 4 shows the tensioning and tension adjusting mechanism. This assembly is duplicated at the other end of the drum allowing for adjustments from either end. The transfer shaft 4 turns in bearings in the inner members 2 and is provided with worm gears 5 which mesh with similar worms 6 on the tension adjusting shafts 3 at both ends of the drum. These tension adjusting shafts 3 are also provided with worm gears 7 in mesh with the large worm gears 8. When the tension adjusting shaft 3 is turned, movement is transmitted through the worm gears 8 which are secured to the tension adjusting members 9. When these members 9 are turned about the main axis in a counter-clockwise direction, compression of the springs 23 is effected, and pressure is thereby resiliently transmitted to the tension idler bar support members 12 which are free to rotate and thence to the tension idler bar 10. Due to inherent characteristics of worm gears, they can be cut with such pitches that their movement is practically irreversible and thereby provide an automatic locking effect holding the springs under the desired compression. The transfer shaft 4 provides for equal and simultaneous adjustment at both ends of the drum.

Diametrically opposite the tension idler bar 10 is a dummy bar 11 which is merely a counter-balance for the tension idler bar 10. Both of these bars are supported at opposite ends of the tension idler bar support members 12. The tension adjusting shafts 3 and their worm gears are counter-balanced by the dummy bars 13. The cam shafts 15 and the clamp backing 16 are counter-balanced by the dummy bars 17, the transfer shaft 4 and the dummy bar 14. Such duplicated parts as the compression springs and their brackets are diametrically disposed so as to effect perfect balance.

It is necessary to form the cams 18 with counter-balancing faces 19 in order that the center of gravity of the cams may not shift when different thicknesses of belts are used.

It will be seen that this design provides a drum in which each of the assembled units functions in balance with another unit and each has its center of gravity axially situated at all adjustments when assembled. This construction provides dynamic and static balance for the assembled drum which condition is essential as explained above.

The tension idler bar 10 is provided with a covering of resilient material such as rubber. This assures uniform tension on the belt even though there may be slight local variations in the belt which would otherwise result in uneven tension if the tension bar had a non-resilient surface. When wide drums are covered with a wide belt cut from coated paper or cloth these variations are prevalent and unless the tension bar has a resilient surface to take up these irregularities, slack portions of the abrasive covered material cause an irregular surface on the work being finished.

Figure 5:
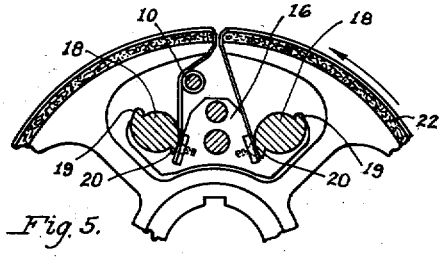
Figure 5 is a sectional view of the tensioning idler and gripping mechanism showing a band in place and under tension.

The ends of the shafts 3 extend into recesses in the cylinder beyond that portion covered with the belt as shown at 21, and are machined for the application of a socket wrench or other tool. To face the drum with a belt a tool is used to turn one of the tension adjusting shafts 3 until the tension idler bar 10 is directly under the slot in the main cylinder. The wrench is then used to turn the cam shafts 15, opening the cams and creating gaps between the cam faces 20 and the clamp backing 16. One end of the band is inserted through the slot and in between the cam shaft and clamp backing under the leading edge of the slot, being the one to the right in the accompanying drawing. The right hand cam shaft is then turned in a clockwise direction clamping the belt securely between the cams and backing member. The belt is then wrapped tightly around the drum on which is cemented a padding of felt or other resilient material 22 and the remaining end inserted through the slot, past the tension idler bar 10 and into clamping position in the other clamp, which is then tightened by turning the left-hand cam shaft in a counter-clockwise direction. The cam faces are so shaped that tension on the belt tends to rotate them in the direction which increases the gripping effect. The tension adjusting shaft 3 is then turned until the tension bar 10 presses against the belt the desired degree. This arrangement is clearly depicted in Figure 5.

Although a specific example of an application of this invention is illustrated and described, modifications will be obvious to those skilled in this art, and protection of this invention is sought within the scope of the annexed claims.

I claim:

1. An abrasive drum comprising in combination a cylinder adapted to be covered with an abrasive coated belt, means for securing the ends of said belt within the cylinder, means for effecting and maintaining any desired degree of tension on said belt, and automatic means for maintaining the said drum in static and dynamic balance at all positions of the said securing means and the said tension means.

2. An abrasive drum comprising in combination a cylinder adapted to be externally covered with an abrasive coated belt, externally operated means for gripping the ends of said belt within the cylinder, externally operated means for effecting and maintaining any desired degree of tension on the belt, and automatic means for maintaining the said drum in static and dynamic balance at all positions of the said gripping means and the said tension means.

3. An abrasive drum comprising in combination a cylinder adapted to be externally surfaced with a replaceable abrasive coated belt, externally operated means for gripping the ends of said belt within the cylinder, externally operated means for effecting and maintaining any desired degree of tension on said belt, and automatic means for maintaining the said drum in static and dynamic balance at all positions of the said gripping means and the said tension means, said gripping means and said tensioning means being adapted to be operated independently of each other.

4. An abrasive drum comprising in combination a cylinder adapted to be externally surfaced with an abrasive coated material, means for gripping the ends of said material within the cylinder, and automatic means for maintaining the said drum in static and dynamic balance at all positions of the said gripping means, said gripping means being operable by a tool applied from the outside of the drum.

5. An abrasive drum comprising in combination a cylinder adapted to be surfaced with an abrasive coated material, and means located within the cylinder for effecting and maintaining any desired degree of tension on said material, automatic means for maintaining the said drums in static and dynamic balance at all positions of the said tension means, said tensioning means being operated by a tool such as, for example, a wrench applied from the outside of the drum.

6. An abrasive drum comprising in combination a cylinder adapted to be externally covered with an abrasive coated belt, means for causing the ends of the belt to be gripped within the cylinder by the application of a tool from the outside of the drum, means for effecting and maintaining any desired degree of tension on the belt by the application of a tool from the outside of the drum, and automatic means for maintaining the said drum in static and dynamic balance at all positions of the said gripping means and the said tension means.

7. In an abrasive drum adapted to be externally covered with replaceable abrasive coated belts, an internal belt gripping device comprising a longitudinal fixed member, two rotatable cam shaped members so disposed whereby rotation of one cam member in one direction effects a closure of the gap between it and the fixed member and rotation of the other cam member in the opposite direction effects a closure of the gap between it and the fixed member while reversal of these directions of rotation effects openings of said gaps, said rotatable cam members having their centers of gravity situated on their axes of rotation and all parts of the said belt gripping device being counter-balanced with respect to the axis of the drum, and means to automatically counterbalance the said belt gripping device with respect to the axis of the drum at all positions of the said device.

8. In an abrasive drum adapted to be externally covered with a replaceable abrasive coated belt having its ends gripped within the drum, an internal belt tensioning device co-axial with the drum and comprising two or more supporting members simultaneously rotatable about the axis of the drum, a longitudinal member whose axis is parallel to the axis of the drum supported by said rotatable supporting members and so situated as to be contactable with the surface of the belt on a line between its entrance to the drum and a gripped end, means to effect and maintain said contact to a desired degree of pressure by the application of a tool from the outside of the drum, and means to automatically counterbalance said contacting member with respect to the axis of the belt tensioning device at all positions of the said device.

9. A polishing wheel having a drum face, a cushion secured on the drum face, an abrasive band surrounding said cushion, and means on the wheel for always imposing a tension on the abrasive band and for automatically statically balancing the wheel for varying amounts of tension.

10. A polishing wheel having a drum face, a cushion secured on the drum face, an abrasive band surrounding said cushion, and means on the wheel for always imposing a tension on the abrasive band as the length thereof is varied between predetermined limits and for automatically statically balancing the wheel for varying lengths of the band.

11. A polishing wheel having a drum face, a cushion secured on the drum face, an abrasive band surrounding said cushion, means on the wheel for always imposing a tensioning pull on the abrasive band for maintaining the band tight on the cushion and for maintaining the dynamic balance of the wheel as the wheel is rotated at high speed.

12. An abrasive drum comprising in combination a cylinder, an abrasive coated belt adapted to cover the cylindrical face of the cylinder, a longitudinal slot in the said cylindrical face not substantially wider than twice the thickness of the abrasive belt and adapted to receive the ends of the belt, means for securing the ends of the belt within the cylinder, means for effecting and maintaining tension on the belt, and automatic means for maintaining the said drum in static and dynamic balance for varying degrees of tension.

13. An abrasive drum comprising in combination a cylinder adapted to be covered with an abrasive coated belt, means for securing the ends of said belt within the cylinder, means for effecting and maintaining tension on said belt, and automatic means for maintaining the said drum in static and dynamic balance at all positions of the said securing means and the said tension means.

14. A polishing wheel having a drum face, a cushion secured on the drum face, an abrasive band surrounding said cushion, and means on the wheel for imposing a tension on the abrasive band and for automatically statically balancing the wheel for varying amounts of tension.

AVERY W. WALKER.